(12) United States Patent
Endo

(10) Patent No.: US 8,808,586 B2
(45) Date of Patent: Aug. 19, 2014

(54) MOLDED PART AND OPTICAL DEVICE USING THE MOLDED PART

(75) Inventor: Hiroyuki Endo, Sagamihara (JP)

(73) Assignee: Ricoh Company, Limited, Tokyo (JP)

( * ) Notice: Subject to any disclaimer, the term of this patent is extended or adjusted under 35 U.S.C. 154(b) by 1916 days.

(21) Appl. No.: 11/768,543

(22) Filed: Jun. 26, 2007

(65) Prior Publication Data

US 2007/0242350 A1    Oct. 18, 2007

(30) Foreign Application Priority Data

Jul. 3, 2006    (JP) .................... 2006-183320

(51) Int. Cl.
*B29D 11/00* (2006.01)
*G02B 5/18* (2006.01)

(52) U.S. Cl.
USPC ........... 264/1.32; 264/2.5; 347/244; 347/258; 359/451; 359/570; 359/573; 359/743

(58) Field of Classification Search
USPC ......... 359/566–574, 451, 454, 456, 742, 743; 369/53.1; 264/1.32, 2.5; 425/808; 362/335; 347/244, 258
See application file for complete search history.

(56) References Cited

U.S. PATENT DOCUMENTS

| | | | |
|---|---|---|---|
| 5,694,247 A | 12/1997 | Ophey et al. | |
| 5,817,396 A | 10/1998 | Perlo et al. | |
| 6,810,303 B2 | 10/2004 | Sagae et al. | |
| 6,836,281 B2 | 12/2004 | Kimura | |
| 2005/0013004 A1 | 1/2005 | Miyakoshi et al. | |
| 2005/0249919 A1 | 11/2005 | Wolfing et al. | |
| 2005/0286376 A1* | 12/2005 | Chung et al. | ................. 369/53.1 |
| 2006/0172119 A1 | 8/2006 | Hayashi et al. | |

FOREIGN PATENT DOCUMENTS

| | | | |
|---|---|---|---|
| JP | 1-107904 | | 4/1989 |
| JP | 7-49471 | * | 2/1995 |
| JP | 9-500459 | | 1/1997 |
| JP | 10-308040 | | 11/1998 |
| JP | 2003-270569 | | 9/2003 |
| JP | 2006-11073 | * | 1/2006 |
| JP | 2006-15598 | | 1/2006 |
| WO | WO2005/010572 A1 | | 2/2005 |
| WO | WO2006/106147 A1 | | 10/2006 |

OTHER PUBLICATIONS

Benedikt Blasi, et al., "Entspiegeln Mit Mottenaugenstrukturen", KU Spritzgiessen, vol. 92, No. 5, XP-001116637, pp. 50-53, May 2002.
Office Action issued Oct. 4, 2011, in Japanese Patent Application No. 2006-183320.

* cited by examiner

*Primary Examiner* — Mathieu D. Vargot
(74) *Attorney, Agent, or Firm* — Oblon, Spivak, McClelland, Maier & Neustadt, L.L.P.

(57) ABSTRACT

A molded part prepared by a mold transfer method using a die, including a surface which includes a slope, wherein a direction of a normal line of the slope is different from a die releasing direction; and a pattern which is formed on the surface and which includes grooves located on a portion of the slope so as to extend along the slope in the slanting direction of the slope. An optical element, which has an anti reflection function, including the molded part mentioned above, wherein the interval between two adjacent grooves is not greater than the wavelength of light irradiating the optical element. An optical device including a light source configured to emit light; and the optical element mentioned above which processes the light emitted by the light source.

17 Claims, 15 Drawing Sheets

MOLDED PART AND OPTICAL DEVICE USING THE MOLDED PART

BACKGROUND OF THE INVENTION

1. Field of the Invention

The present invention relates to a molded part having a slanted surface, a curved surface and/or a sculptured surface, which has a fine pattern. In addition, the present invention also relates to a die for forming the part; an optical element using the molded part; and an optical device (such as optical scanning devices, image displaying devices and optical pickup devices) using the optical element.

2. Discussion of the Background

In general, it is important to control reflection of light at the surface of an optical element. In attempting to prevent reflection at the surface of an optical element, a technique such that a multiple dielectric layer is coated on such a surface has been used. Specifically, such an optical element is prepared by performing plural processes such as preparation of a part by a molding method (such as injection molding) and formation of such a multiple dielectric layer on the surface of the part using a coating device. Since these processes take a long time, the resultant optical element has a high manufacturing cost.

Recently, in attempting to solve the cost problem, a technique in that fine patterns are formed on the surface of an optical element to prevent reflection of light at the surface of the optical element has been used. Such fine patterns are formed on the optical element by using a die, on the surface of which fine patterns are formed by a mechanical method of a method including a semiconductor process. Namely, fine patterns corresponding to the fine patterns formed on the surface of the die are formed on the surface of the molded optical element, which is made of a material such as resins and glass. Here in after, this method is sometimes referred to as a mold transfer method.

Published unexamined Japanese patent application No. (hereinafter referred to as JP-A) 2003-270569 discloses a scanning optical system and an image forming apparatus using the system. It is described therein that excellent optical performance is obtained by appropriately setting the array direction of a fine structural grating in accordance with the polarization plane of an incident luminous flux and reducing the influence of the structural double refraction of a fine grating structure. Specifically, in the scanning optical system as illustrated in FIG. 1B, a luminous flux emitted by a laser light source 1 is deflected by a deflecting means 5, and the deflected luminous flux is focused on a surface 7 while scanned by a scanning optical means 6. The scanning optical means 6 includes a first scanning lens 6a having one or more optical surfaces having a fine structural grating 8 (including a grating portion 81 and a non-grating portion 82). The grating pitch of the fine structural grating is shorter than the wavelength of the luminous flux and the fine structural gratings are arrayed in parallel over the entire surface of the scanning lens 6a.

In addition, recently fine patterns such as a number of fine grooves are formed on the surface of a molded part to control the wettability and/or the friction coefficient of the surface. Such fine patterns are typically formed by a mold transfer method.

When such fine patterns are formed by a mold transfer method, a problem in that the die used cannot be well released from the molded part and thereby the quality of the resultant fine patterns is degraded (i.e., the desired function cannot be imparted to the molded part) occurs.

In addition, when the slope of the surface of the molded part is sharp relative to the die releasing direction (i.e., when the angle formed by the slope and the die releasing direction is large as illustrated in FIG. 3), a problem in that fine patterns such as rectangular grooves cannot be formed on the molded part occurs.

Referring to FIG. 1A, the background art disclosed in JP-A 2003-270569 uses the scanning lens 6a having one or more optical surfaces having the fine structural grating 8 including grating portions (i.e., grooves) 81 and non-grating portions 82, which are arranged so as to be parallel to each other. Thus, the scanning lens 6a has fine patterns which are slanted against the curved surface of the lens. When such fine patterns are formed by a mold transfer method, a problem in that the die used cannot be well released from the molded part and thereby the quality of the resultant fine patterns is degraded occurs. Specifically, as illustrated in FIG. 1B, a light beam is slantingly launched into the surface of the scanning lens 6a. Therefore, it is preferable that the grooves 81 face the light beam (i.e., the grooves are also slanted) to improve the optical property of the lens 6a. When such grooves are formed by a mold transfer method, it is hard to release the die from the molded part (lens) because the die releasing direction is different from the direction of the grooves. Therefore, a problem in that the die used cannot be well released from the molded part and thereby the quality of the resultant fine patterns is degraded occurs.

Particularly, when a part having a curved surface having rectangular grooves thereon is prepared by a mold transfer method, releasing of the die used is very difficult because the projections of the die cannot be released from the grooves formed on the surface of the part. Specifically, when the die releasing direction is the same as the direction of the rectangular grooves as illustrated in FIG. 2, releasing of the die can be well performed. However, when the die releasing direction is largely different from the direction of the rectangular grooves as illustrated in FIG. 3, releasing of the die is very difficult. In this case, the grooves cannot be well formed (i.e., the grooves are damaged). In other words, only parts having steps (as illustrated in FIG. 4) on the surface thereof can be molded by a mold transfer method.

Because of these reasons, a need exists for fine patters, which can be well formed on slanted surfaces, curved surfaces and sculptured surfaces by a mold transfer method to improve properties of the surface such as reflection preventing property, wettability and friction coefficient.

SUMMARY OF THE INVENTION

As an aspect of the present invention, a molded part is provided which is formed by a mold transfer method and which has a pattern on a slanted or curved surface there of (hereinafter sometimes referred to as a slope), wherein the normal line direction of the slope is different from the die releasing direction. The pattern formed by the die on the surface of the molded part includes grooves extending along the slope in the slanted direction of the slope, and the interval between two adjacent grooves is not greater than a predetermined length.

It is preferable that the grooves are radial grooves which radially extend and which have a center at a point, at which the normal line direction is identical to the die releasing direction.

As another aspect of the present invention, an optical element is provided which includes the molded part mentioned above, wherein the molded part is substantially transparent and receives light, and wherein the interval between two adjacent grooves is not greater the wavelength of the light used for the optical element.

As yet another aspect of the present invention, an optical device is provided which includes a light source and the optical element mentioned above which processes light emitted from the light source. For example, an optical scanning device is provided as an example of the optical device, which includes a light source, a collimating device configured to collimate the light flux emitted from the light source, a deflection device configured to deflect the collimated light flux, a scanning and focusing device configured to focus the deflected light flux on a surface of a material while scanning, wherein at least one of the collimating device and the scanning and focusing device includes the optical element mentioned above.

As another example of the optical device, an image displaying device is provided which includes a light source, an illuminating device configured to guide the light, an image displaying element, and a projection lens, wherein at least one of the illuminating device and projection lens includes the optical element mentioned above.

As yet another example of the optical device, an optical pickup device is provided which includes a light source, a collimating device configured to collimate the light flux emitted from the light source, an objective lens configured to focus the collimated light flux on an optical recording medium, a condenser configured to condense the light flux reflected from the optical recording medium, and a photodetector, wherein at least one of the optical system, objective lens and condenser includes the optical element mentioned above.

As a further aspect of the present invention, a die for forming a molded part is provided which includes a pattern on an inner surface thereof, wherein the pattern includes a patter for forming grooves on at least a portion of a slope on a surface of the molded part, wherein the direction of the normal line of the slope is different from the die releasing direction.

As a still further aspect of the present invention, a method for molding apart having a slope on a surface thereof is provided which include the following steps:

providing a die having, on an inner surface thereof, at least a groove pattern for forming grooves on at least a portion of the slope of the surface of the part;

subjecting a resin to molding using the die;

releasing the die from the molded part so that a releasing direction of the die is different from a direction of a normal line of the slope of the part.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1A:
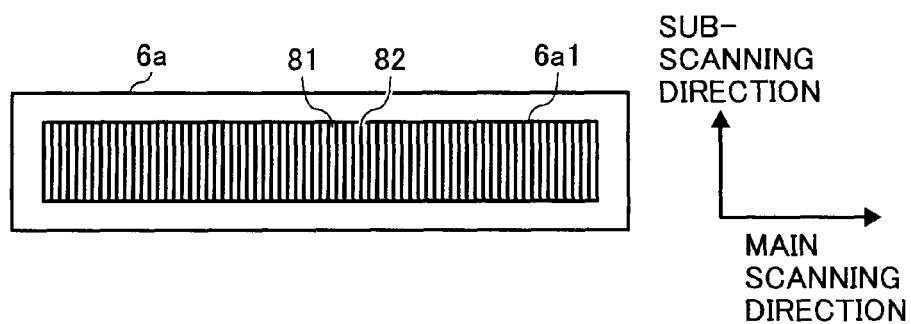
FIGS. 1A and 1B include schematic views illustrating a background optical scanning device and grooves formed on a scanning lens thereof.
Figure 1B:
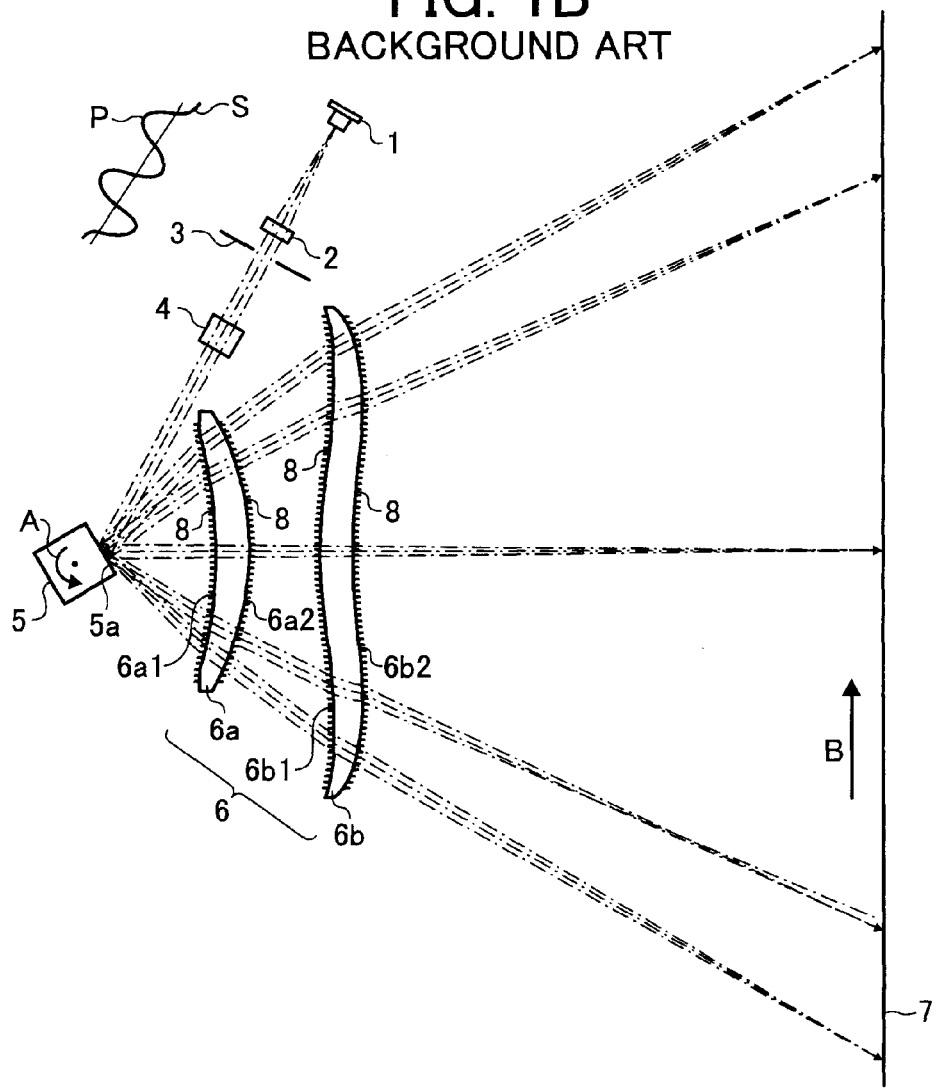
Figure 2:
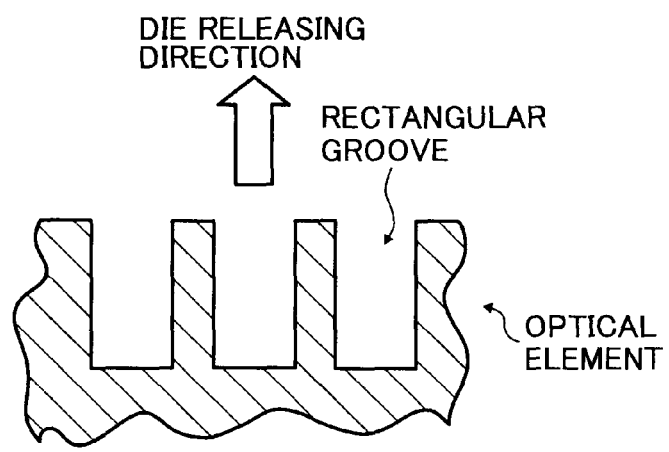
FIGS. 2 and 3 are schematic views for explaining the die releasing direction and the direction of grooves.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this application, specify the presence of stated features, integers, steps, operations, elements, and/or components, but do not preclude the presence or addition of one or more other features, integers, steps, operations, elements, components, and/or groups thereof.

The present invention will be explained in detail by reference to drawings.

One object of the present invention is to provide, by a mold transfer method, a part having a slanting surface, a curved surface (such as spherical surface and non-spherical surface) and/or a sculptured surface, on the surface of which a fine patter including plural grooves is formed, wherein the normal line of the slope is different from the die releasing direction. The grooves are formed so as to extend along the slanted or curved surface, and the interval between two adjacent grooves is not greater than a predetermined length (such as the wavelength of the light irradiating the part (optical element)). The slanting surface, curved surface and sculptured surface are hereinafter sometimes referred to as a slope.

Next, a case where the molded part is an optical element will be explained.

When a fine pattern is formed on a surface of an optical element having a slope, a point at which the die releasing direction is identical to the direction of the normal line of the surface at the point serves as a reference point. Namely, a reference point is set to a portion of the slope, which is perpendicular to the die releasing direction. In general, in a case where the slope has an inverted U-form, the reference point is typically set to the top of the inverted U-form slope. In a case where the slope has a U-form, the reference point is typically set to the bottom of the U-form slope. When the slope has only one top (highest point) or one lowest point, the point serves as the reference point. Namely, a fine pattern is formed around the reference point, which is the center of the pattern. When the slope has plural tops (highest points) or plural lowest points, the slope has plural reference points.

Plural fine grooves are radially formed from the reference point (i.e., the center). In addition, fine grooves (hereinafter sometimes referred to as intervening grooves) are formed between the radially extending grooves. In this regard, interval between two adjacent grooves (grooves and intervening grooves) is not greater than the wavelength of light used for the optical element. The radially extending grooves do not necessarily have a common reference point (center), and may be radially extending grooves starting from a point near the reference point.

Figure 5:
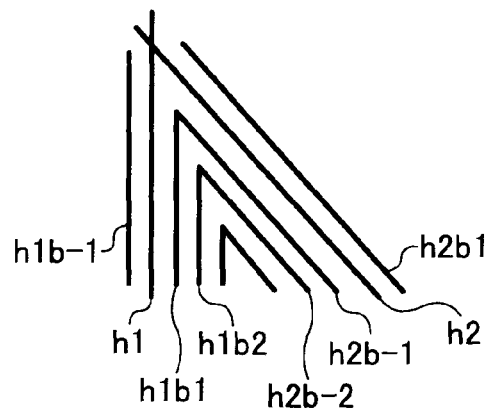
FIG. 5 is a schematic view illustrating an example of a group of grooves for use in the molded part of the present invention.

Referring to FIG. 5, an intervening groove h1b1 is formed so as to be adjacent to a groove h1, which is linearly-extending in a radial direction, while being apart from the groove h1 by a distance not greater than a predetermined distance. Similarly, an intervening groove h2b-1 is formed so as to be adjacent to a groove h2, which is linearly-extending in the radial direction, while being apart from the groove h2 by a distance not greater than the predetermined distance. The intervening grooves h1b1 and h2b-1 have an intersection, but the intervening grooves do not extend toward the center (reference point) from the intersection. In this regard, the intervening grooves do not necessarily have an intersection, and the start point of the intervening groove h1b1 may be apart from the start point of the intervening groove h2b-1 at a distance substantially equal to the interval therebetween.

As illustrated in FIG. 5, other intervening grooves h1b2 and h2b-2 are formed in the vicinity of the intervening grooves h1b1 and h2b-1. Similarly, intervening grooves h1b-1 and h2b1 are also formed. Thus, fine grooves are formed on at least the surface of an optically effective region of the optical element. Thus, fine grooves are preferably formed on the surface of the optical element in such a manner that the interval between two adjacent grooves is not greater than a predetermined length (e.g., the wavelength of the light used for the optical element). In this regard, the depth of the grooves is preferably larger than the interval between two adjacent grooves so that the surface of the resultant optical element has good reflection preventing property. The reflection preventing property of the optical element changes depending on the wavelength of the light used, shapes (such as width and depth) of the grooves formed, and the interval of two adjacent grooves.

Figure 6:
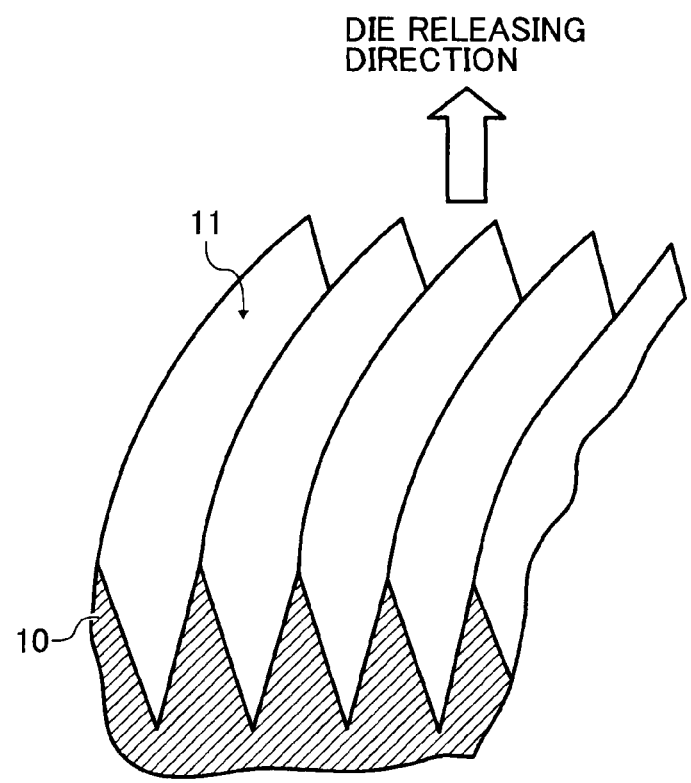
FIG. 6 is a schematic view illustrating another example of a group of grooves for use in the molded part of the present invention, wherein the grooves have the same direction as the releasing direction.
Figure 8:
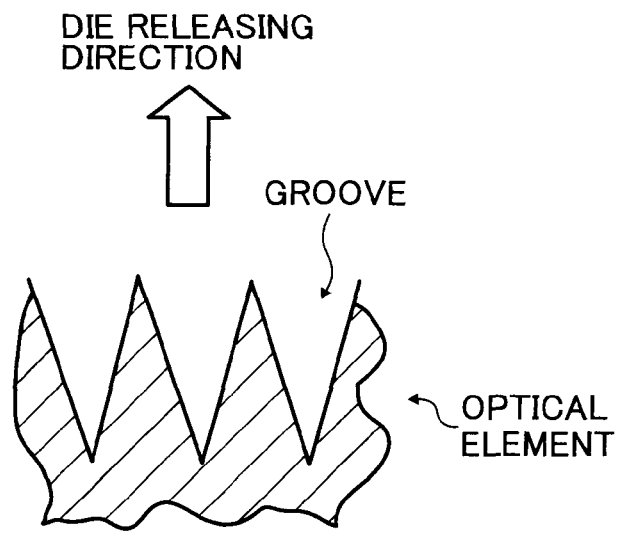
FIG. 8 is a schematic view illustrating grooves having the same direction as the die releasing direction.

One example of such fine grooves is illustrated in FIG. 6. Referring to FIG. 6, grooves 11 are formed on the surface of an optical element 10 so as to extend in the slanting direction of the slope. In this regard, the interval between two adjacent grooves is not greater than a predetermined length. In addition, since the direction of the grooves is identical to the die releasing direction as illustrated in FIG. 8, the die used for molding the optical element can be easily released from the molded optical element.

Figure 3:
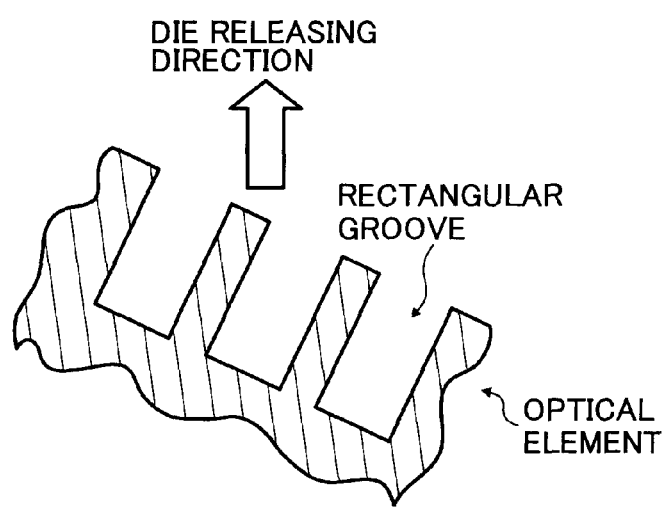
Figure 4:
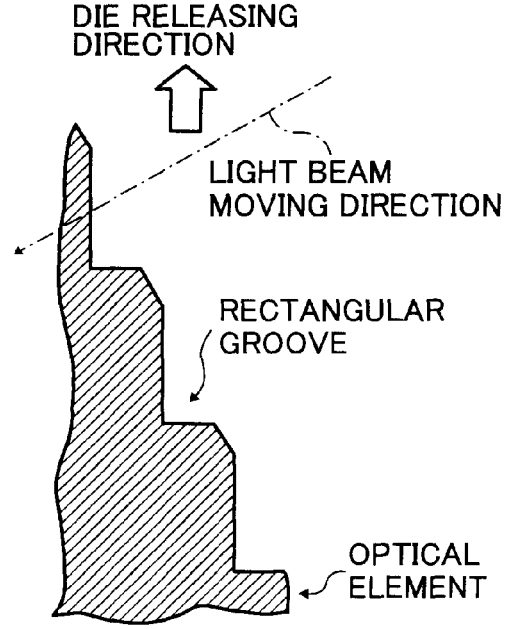
FIG. 4 illustrates the surface of an optical element having grooves, which have the same direction as the releasing direction but which are no longer grooves but steps.
Figure 7A:
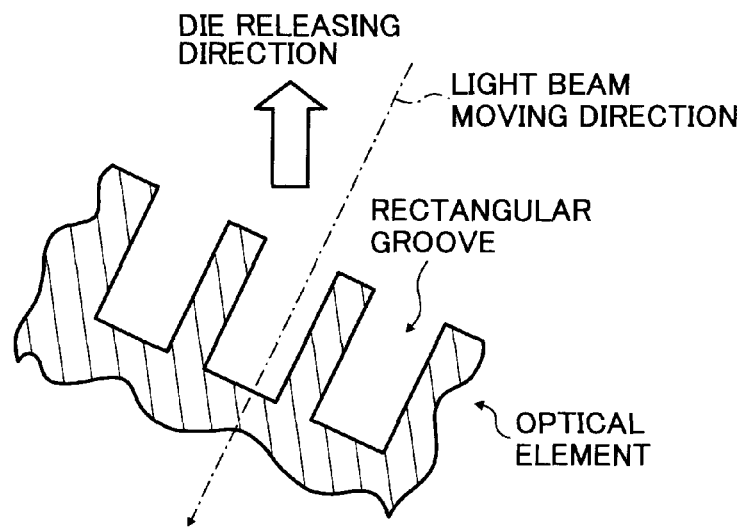
FIGS. 7A-7C include schematic views for explaining the difference between grooves for use in the present invention and background grooves.
Figure 7B:
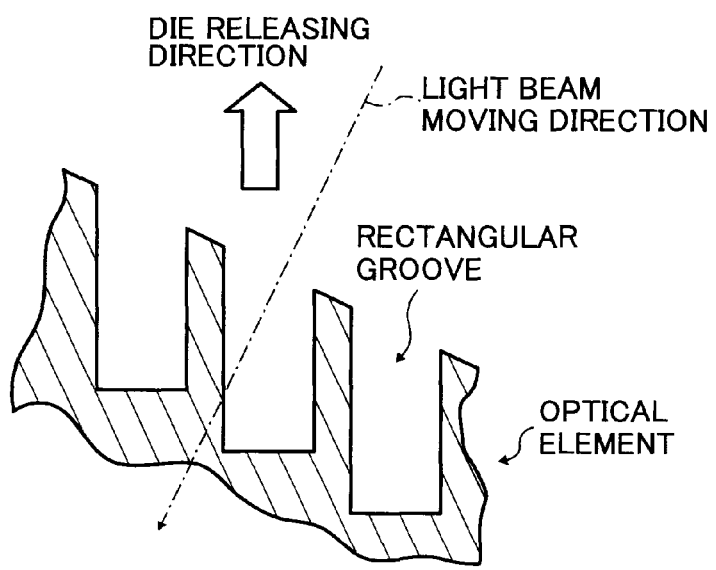
Figure 7C:
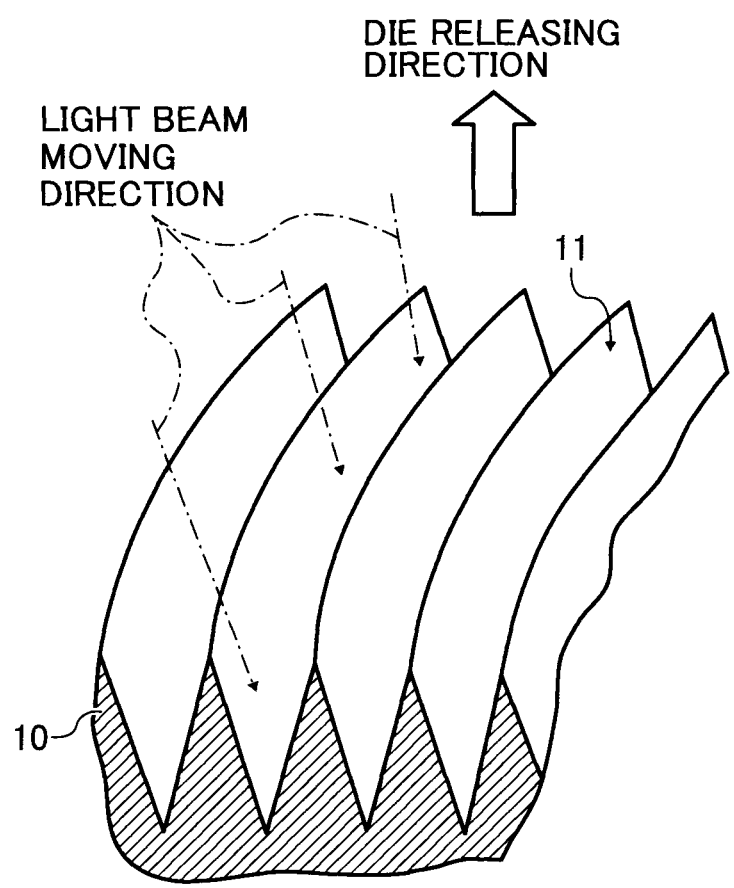

FIGS. 7A and 7B illustrate grooves formed by conventional methods, and FIG. 7C illustrates grooves formed by the method of the present invention. Specifically, FIG. 7A illustrates an optical element having rectangular grooves having a direction different from the die releasing direction similarly to the grooves illustrated in FIG. 3. Since the direction of the rectangular grooves of this optical element illustrated in FIG. 7A is identical to the light beam moving direction, the optical element has good reflection preventing property. However, the direction of the rectangular grooves is different from the die releasing direction, and thereby a problem in that the grooves are damaged when the die is released from the molded part tends to occur. FIG. 7B illustrates an optical element having rectangular grooves having a direction different from the light beam moving direction. Since the direction of the rectangular grooves of this optical element is identical to the die releasing direction, the optical element has good die releasability. However, the direction of the rectangular grooves is different from the light beam moving direction, and therefore the optical element has poor reflection preventing property. Thus, when grooves are formed on a slope of an optical element, it is hard to impart a good combination of die releasability and reflection preventing property to the optical element (i.e., die releasability and reflection preventing property are incompatible) particularly when the slanting angle of the slope is large. In general, the larger the depth of the grooves relative to the pitch thereof, the lower the reflectance of the surface of the optical element. Namely, the higher the aspect ratio (i.e., depth/width ratio) of grooves, the better reflection preventing property the grooves have. It can be easily understood from FIGS. 7A and 7B that it is difficult to release the die from fine grooves having a high aspect ratio.

In contrast, as illustrated in FIG. 7C, the grooves 11 formed by the method of the present invention extend in the slanting direction of the slope and the interval between two adjacent grooves is not greater than a predetermined interval. As illustrated in FIG. 7C, the direction of the grooves is identical to the die releasing direction and the light beam moving direction, and thereby, a good combination of die releasability and reflection preventing property can be imparted to the optical element.

Figure 9:
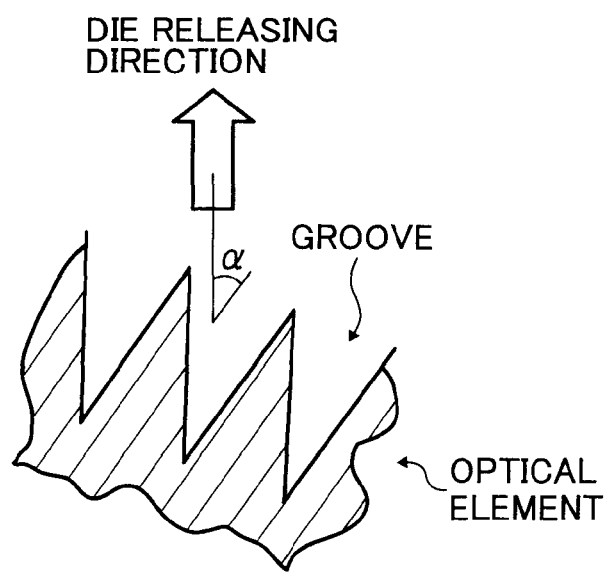
FIG. 9 is a schematic view illustrating grooves having a direction different from the die releasing direction to an extent such that the grooves can be released from the die used.
Figure 15A:
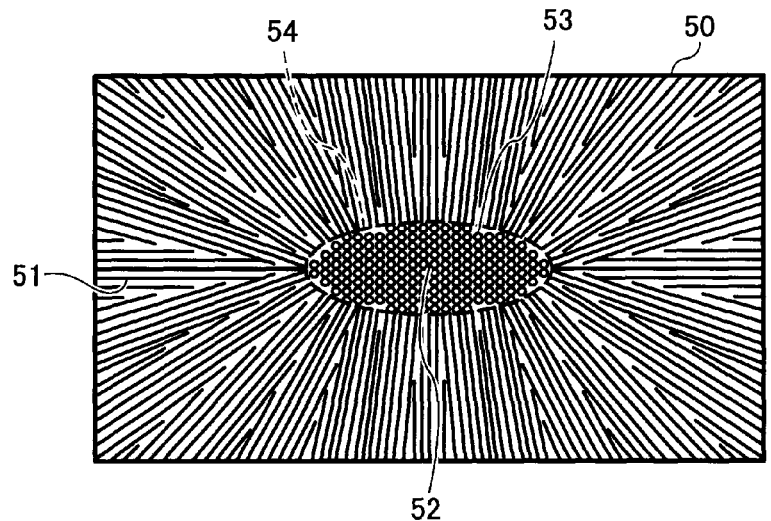
FIGS. 15A and 15B include a schematic view illustrating the surface of another example of the optical element of the present invention and an enlarged perspective view of the center portion of the surface.

In the optical element (molded part) of the present invention, the angle between the die releasing direction and the normal line of the surface of the optical element is low in the vicinity of the reference point (center). Therefore, the die used can be easily released from the molded optical element similarly to a case where grooves are formed on a flat surface. In other words, it is possible to form conventional fine patters (such as circular cone patterns and pyramid patterns) in a central portion, which is located near the reference point (center) and which has a slanting angle such that grooves can be well released from the die, i.e., the grooves have a releasing angle not higher than a predetermined angle α as illustrated in FIG. 9. In addition, a plurality of radially extending grooves 51, which do not have a common center, can be formed around such a central portion as illustrated in FIG. 15A. In this case, intervening grooves are formed such that the interval between two adjacent grooves is not greater than a predetermined interval.

The shape of the grooves is not particularly limited, and grooves having a property such that the width of the top of the grooves is greater than the width of the bottom thereof, such as V-form grooves, U-form grooves, and trapezoid-form grooves, can be preferably used. Rectangular grooves can be used if the width of the top thereof is greater than the width of the bottom thereof.

Thus, by using the method mentioned above, a molded part (an optical element) which has a fine groove pattern on a slope thereof and which has a good combination of reflection preventing property, wettability and friction coefficient can be easily prepared by a molding method without causing a die releasing problem. The thus prepared optical element can be preferably used for various optical devices.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Figure 10:
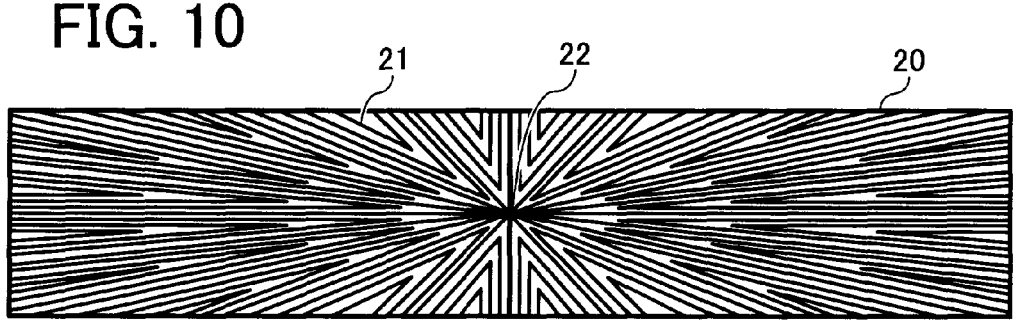
FIG. 10 is a schematic view illustrating the surface of an example of the optical element of the present invention.

FIG. 10 is a schematic view illustrating an example of the optical element of the present invention. The optical element is used as, for example, a scanning lens of a light scanning device for use in laser printers. The surface of an optical element 20 illustrated in FIG. 10 has a curvature radius of 200 mm in the main scanning direction (i.e., the horizontal direction in FIG. 10) and a curvature radius ranging from 40 mm to 100 mm in the sub-scanning direction (i.e., the vertical direction in FIG. 10).

The optical element 20 has a reference point 22 (the center of the surface in this case) at which the die releasing direction is identical to the direction of the normal line of the surface. As illustrated in FIG. 10, grooves 21 radially extend from the center 22 toward the edge of the optical element. In this regard, the die releasing direction is the direction perpendicular to the surface of a paper sheet on which FIG. 10 is illustrated. In this example, twenty radial grooves cross at the center 22. However, the grooves are not limited thereto and grooves not crossing at the center 22 can also be used therefor. Other fine grooves (intervening grooves) are present between the twenty grooves. In this example, the interval between two adjacent grooves is set to be not greater than 240 nm. It is clear from FIG. 10 that the two adjacent grooves are not parallel to each other and therefore the interval therebetween changes depending on the position of the grooves.

The grooves have a V-form and the width and depth thereof are 200 nm and 400 nm, respectively. In this regard, the depth of the grooves may be the depth of the grooves which is determined by measuring the depths of grooves in a profile (cross-section) of the entire surface of the optical element cut in the die releasing direction or by measuring the depths of grooves in cross-sections of portions of the surface cut in the normal line direction of the portions. However, it is preferable that the depth is determined by measuring the depths of grooves in cross-sections of portions of the surface cut in the light beam moving direction of the portions. Namely, it is preferable that the grooves face in the light beam moving direction, and each of the grooves has a depth of 400 nm in the light beam moving direction.

The die (not shown) used for molding the resinous optical element 20 having such fine groove patterns as illustrated in FIG. 10 has inverted groove patterns on the surface thereof. Such fine groove patterns are previously formed on the surface of the die. The optical element 20 was prepared using the die and a resin molding method such as injection molding and press molding.

It was confirmed that the surface of the thus prepared optical element 20 has a reflectance of not greater than 0.3% against a laser beam with a wavelength of 650 nm.

Example 2

Figure 11:
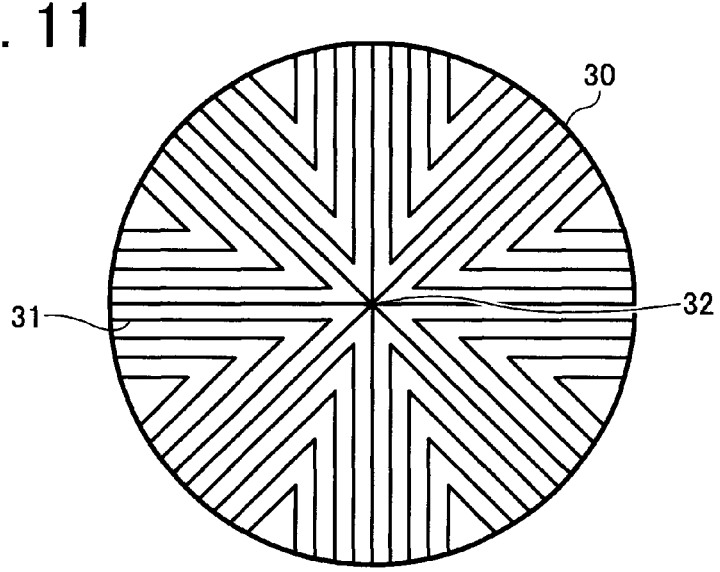
FIG. 11 is a schematic view illustrating the surface of another example of the optical element of the present invention.

FIG. 11 is a schematic view illustrating another example of the optical element of the present invention. This optical element is used as, for example, a lens for an image displaying device (projector) or a lens for an optical device (such as cameras and video cameras).

Referring to FIG. 11, an optical element (lens) 30 has a reference point 32 (the center of the surface in this case) at which the die releasing direction is identical to the direction of the normal line of the surface. As illustrated in FIG. 11, grooves 31 radially extend from the center 32. In this regard, the die releasing direction is the direction perpendicular to the surface of a paper sheet on which FIG. 11 is illustrated. In this example, eight grooves cross at the center 32. Other fine grooves (intervening grooves) are present between the eight grooves. In this example, the interval between two adjacent grooves is set to be not greater than 300 nm. Thus, the fine grooves 31 are formed on at least the optically effective region of the surface of the optical element 30.

The grooves have a V-form and the width and depth thereof are 300 nm and 450 nm, respectively. Similarly to the optical element 20 in Example 1, each of the grooves has a depth of 450 nm in the light beam moving direction.

The die (not shown) used for molding the resinous optical element 30 having such fine groove patterns as illustrated in FIG. 11 has inverted groove patterns on the surface thereof. Such inverted groove patterns are previously formed on the surface of the die. The optical element 30 was prepared using the die and a resin molding method such as injection molding and press molding.

It was confirmed that the surface of the thus prepared optical element 30 has a reflectance of not greater than 0.4% against light in a visible range of from about 400 nm to about 800 nm.

Example 3

Figure 12:
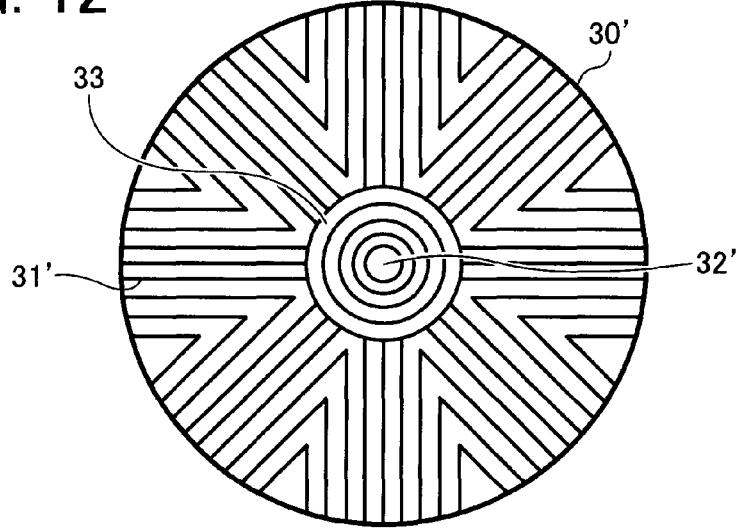
FIG. 12 is a schematic view illustrating the surface of another example of the optical element of the present invention.

FIG. 12 is a schematic view illustrating another example of the optical element of the present invention. The optical element is used as, for example, a collimator lens for an optical device for use in laser beam printers, or a lens of an optical device (such as collimator lenses, objective lenses or condenser lenses) for use in optical pickup devices.

Referring to FIG. 12, an optical element (lens) 30' has a reference point 32' (the center of the surface in this case) at which the die releasing direction is identical to the direction of the normal line of the surface. Similarly to the grooves 31 illustrated in FIG. 11, grooves 31' radially extend along the slope of the optical element. In this regard, the die releasing direction is the direction perpendicular to the surface of a paper sheet on which FIG. 12 is illustrated. Other fine grooves (intervening grooves) are present between the eight grooves. In this example, the interval between two adjacent grooves is set to be not greater than 300 nm. Thus, the fine grooves 31' are formed on at least the optically effective region of the surface of the optical element 30' similarly to the optical element 30 illustrated in FIG. 11. However, the optical element 30' has plural concentric grooves 33 near the center 32'. The interval between two adjacent grooves of the concentric grooves 33 is 300 nm.

Figure 13:
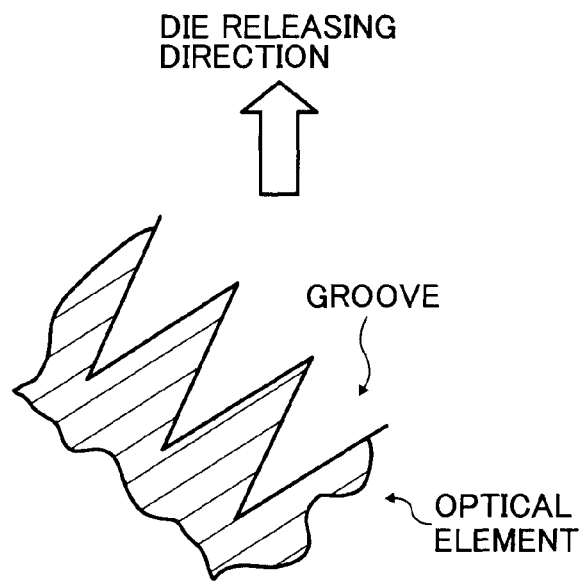
FIG. 13 is a schematic views illustrating grooves having a direction such that the grooves cannot be released from the die used.

In order that this optical element 30' has a good reflection preventing property, the direction of the grooves is preferably identical to the light beam moving direction. In this case, the direction of the concentric grooves 33 near the center 32' is easily released from the die as illustrated in FIG. 8. If the concentric grooves 33 are far apart from the center 32', the concentric grooves are largely slanted against the die releasing direction as illustrated in FIG. 13, and therefore the optical element can not be released from the die. Therefore, in this example, the concentric grooves 33 are formed on a central portion of the surface, which has a relatively low slanting angle. In addition, the radial grooves 31', which radially extend while the center 32' serves as the reference point thereof, are formed on the other portions of the surface, which have a relatively large slanting angle, to prevent the die releasing problem.

The shape of the fine patterns formed on the central portion of the optical element is not limited to the concentric grooves, and other patterns such as circular cone patterns and pyramid patterns are available.

The grooves 31' and 33 illustrated in FIG. 12 have a V-form and the width and depth there of are 300 nm and 500 nm, respectively. It is preferable that each of the grooves has a depth of 500 nm in the light beam moving direction.

The die (not shown) used for molding the resinous optical element 30' having such fine groove patterns as illustrated in FIG. 12 has inverted groove patterns on the surface thereof. Such inverted groove patterns are previously formed on the surface of the die. The optical element 30' was prepared using the die and a resin molding method such as injection molding and press molding.

It was confirmed that the surface of the thus prepared optical element 30' has a reflectance of not greater than 0.3% against a laser beam with a wavelength of 600 nm.

Example 4

Figure 14:
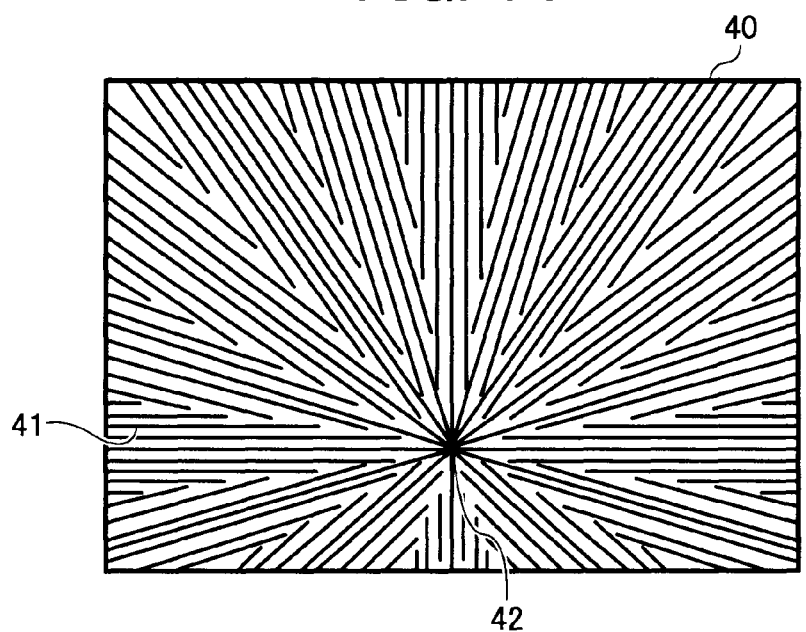
FIG. 14 is a schematic view illustrating the surface of another example of the optical element of the present invention.

FIG. 14 is a schematic view illustrating another example of the optical element of the present invention. The optical element is used as, for example, an eccentric projection lens for an image displaying device (projector).

Referring to FIG. 14, an optical element (lens) 40 has an optical axis, which is located on a lower portion of the optical element, i.e., which is not the center of the surface of the optical element. In this example, sixteen grooves 41 radially extend from a reference point 42 at which the die releasing direction is identical to the direction of the normal line of the surface. In this regard, the die releasing direction is the direction perpendicular to the surface of a paper sheet on which FIG. 14 is illustrated. Other fine grooves (intervening grooves) are present between the sixteen grooves. In this example, the interval between two adjacent grooves is set to be not greater than 250 nm. Thus, the fine grooves 41 are formed on at least the optically effective region of the surface of the optical element 40.

The grooves 41 have a V-form and the width and depth thereof are 250 nm and 350 nm, respectively. Similarly to the optical element 20 in Example 1, it is preferable that each of the grooves has a depth of 350 nm in the light beam moving direction.

The die (not shown) used for molding the resinous optical element 40 having such fine groove patterns as illustrated in FIG. 14 has inverted groove patterns on the surface thereof. Such inverted groove patterns are previously formed on the surface of the die. The optical element 40 was prepared using the die and a resin molding method such as injection molding and press molding.

It was confirmed that the surface of the thus prepared optical element 40 has a reflectance of not greater than 0.2% against light in a visible region of from about 400 nm to about 800 nm.

Example 5

Figure 15B:
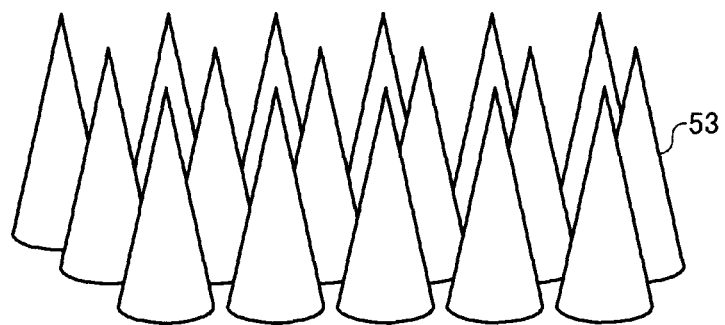
Figure 16:
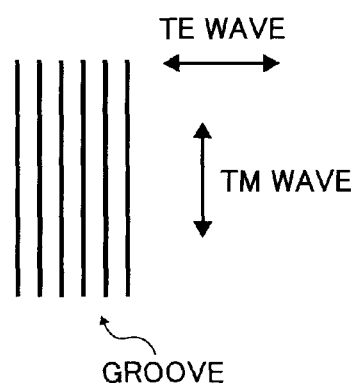
FIG. 16 is a schematic view for explaining the direction of grooves and the polarizing direction of light (TE wave and TM wave)

FIGS. 15A and 15B are schematic views illustrating another example of the optical element of the present invention. The optical element is used as, for example, a collimator lens of an optical device for use in laser beam printers.

As illustrated in FIG. 15A, projections 53 having a circular cone shape (as illustrated in FIG. 15B) are formed on an elliptical-form central portion 54 of the surface of an optical element 50 to impart good reflection preventing property to the optical element. FIG. 15B is an enlarged view of the projections 53. In addition, grooves 51 radially extend along the slope of the optical element while starting from the outer portion of the central portion 54. Namely, the grooves 51 do not have a common center (reference point). In addition, other fine grooves (intervening grooves) are present between the grooves. In this example, the interval between two adjacent grooves is set to be not greater than 250 nm. Thus, the fine grooves 51 are formed on at least the optically effective region of the surface of the optical element 50.

The grooves 51 have a U-form and the width and depth there of are 250 nm and 350 nm, respectively. Similarly to the optical element 20 in Example 1, it is preferable that each of the grooves has a depth of 350 nm in the light beam moving direction.

The die (not shown) used for molding the resinous optical element 50 having such fine groove patterns as illustrated in FIG. 15A has inverted groove patterns on the surface thereof. Such inverted groove patterns are previously formed on the surface of the die. The optical element 50 was prepared by a resin molding method such as injection molding and press molding.

It was confirmed that the surface of the thus prepared optical element 50 has a reflectance of not greater than 0.3% against a laser beam with a wavelength of 633 nm.

The grooves thus formed on the surface of the optical elements are radially arranged in appearance. However, the grooves are arranged at intervals of not greater than the wavelength of the light used for the optical elements, and thereby good reflection preventing property can be imparted to the optical elements.

Figure 17:
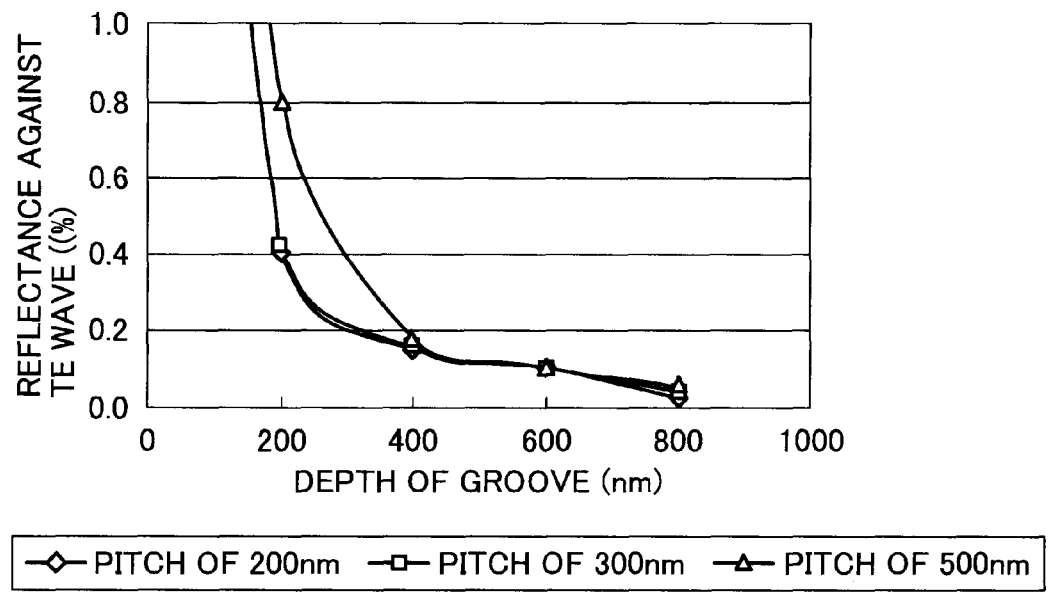
FIG. 17 is a graph illustrating the relationship between the depth of grooves and the reflectance of the grooves against a TE wave.
Figure 18:
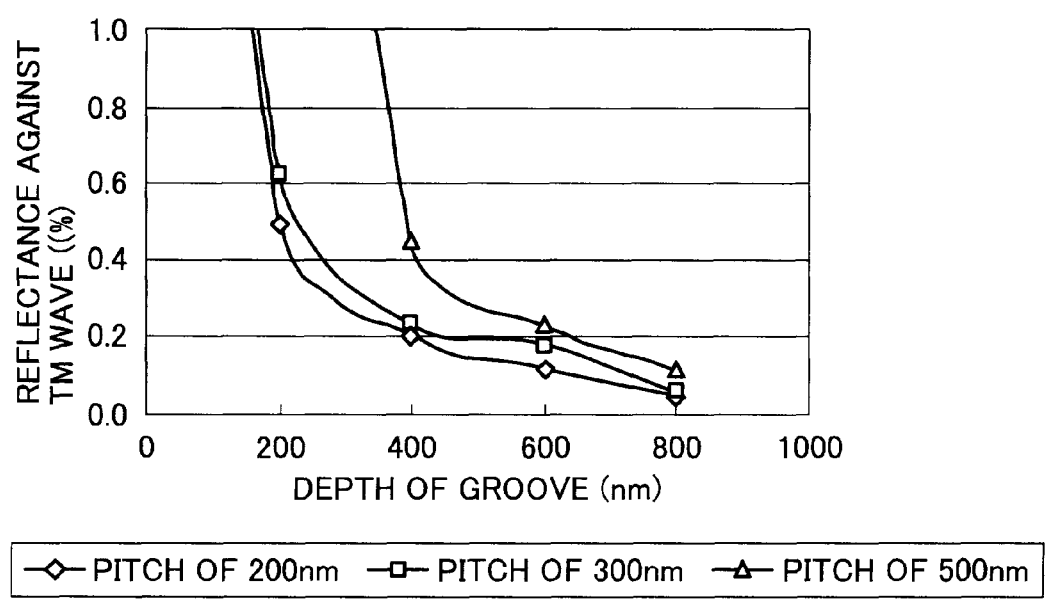
FIG. 18 is a graph illustrating the relationship between the depth of grooves and the reflectance of the grooves against a TM wave.

FIGS. 17 and 18 are graphs illustrating relationships between the depth of grooves formed on the surface of an optical element and the reflectance of the surface against a TM wave and a TE wave. In this regard, as illustrated in FIG.

16, the TM wave is defined as light which is polarized so as to have a direction parallel to the grooves, and the TE wave is defined as light which is polarized so as to have a direction perpendicular to the grooves. In addition, the wavelength of the light used is 650 nm and the refractive index of the optical element is 1.525. Further, the pitch of the grooves is changed so as to be 200 nm, 300 nm and 500 nm. It can be understood from FIGS. 17 and 18 that when the grooves have a depth of not less than 400 nm and a pitch of 200 nm, the surface of the optical element has a reflectance of not greater than 0.2% against both the TM wave and TE wave. Thus, by forming grooves having such properties, good reflection preventing property can be imparted to the optical element.

The molded part of the present invention can be used for diffraction optical elements, Fresnel lenses, optical elements having a curvature in only one direction, optical elements having a complex curved surface, etc, as well as the above-mentioned optical elements. Some examples of such optical elements will be explained below.

Example 6

Figure 19A:
FIGS. 19A and 19B include a schematic cross-sectional view and a plan view illustrating the surface of a diffraction optical element, which is an example of the present invention.
Figure 19B:
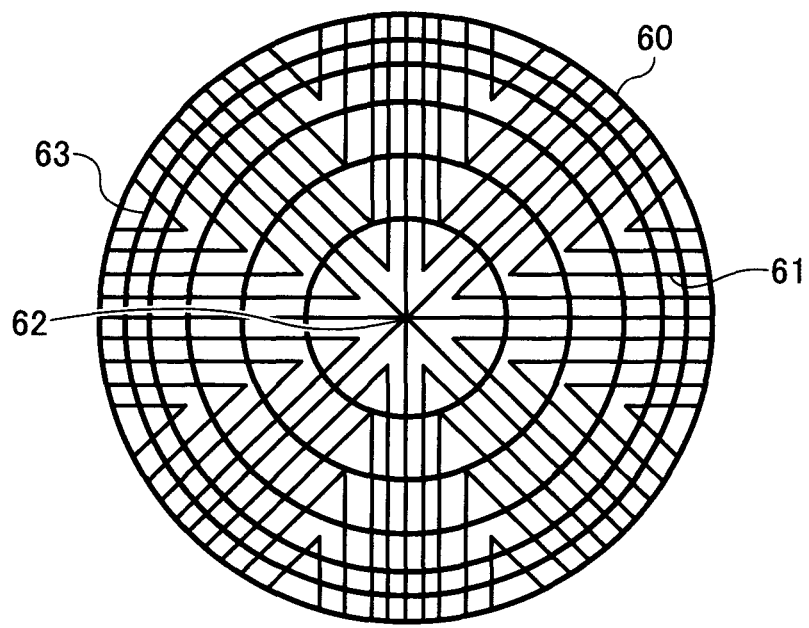

FIGS. 19A and 19B are schematic cross-sectional and plan views illustrating another example (diffraction grating) of the optical element of the present invention.

Referring to FIGS. 19A and 19B, an optical element 60 includes a diffraction grating 63, a reference point 62 at which the die releasing direction is identical to the direction of the normal line of the surface, and eight grooves 61 which radially extend from the reference point 62. In this regard, the die releasing direction is the direction perpendicular to the surface of a paper sheet on which FIG. 19B is illustrated. Other fine grooves (intervening grooves) are present between the eight grooves. In this example, the interval between two adjacent grooves is set to be not greater than 280 nm. Thus, the fine grooves 61 are formed on at least the optically effective region of the surface of the optical element 60.

The grooves 61 have a V-form and the width and depth thereof are 280 nm and 430 nm, respectively. Similarly to the optical element 20 in Example 1, it is preferable that each of the grooves has a depth of 430 nm in the light beam moving direction.

The die (not shown) used for molding the resinous optical element 60 having such fine groove patterns as illustrated in FIG. 19B has inverted groove patterns on the surface thereof. Such inverted groove patterns are previously formed on the surface of the die. The optical element 60 was prepared using the die a resin molding method. This optical element has good releasability and desired V-form grooves can be formed thereon.

It was confirmed that the surface of the thus prepared optical element 60 has a reflectance of not greater than 0.3% against a laser beam with a wavelength of 650 nm. This optical element 60 can be used as, for example, a diffraction lens for collimating a laser beam, which can be used for optical scanning devices and optical pickup devices.

In FIG. 19B, it appears that the grooves in a blaze (which is an area having a ring form) is connected with the grooves in the adjacent blaze. However, the grooves are not necessarily continuous at a boundary between two adjacent blazes. Namely, each blaze can include independent grooves. The grooves used for this example can also be used for the surface of Fresnel lenses.

Example 7

Figure 20A:
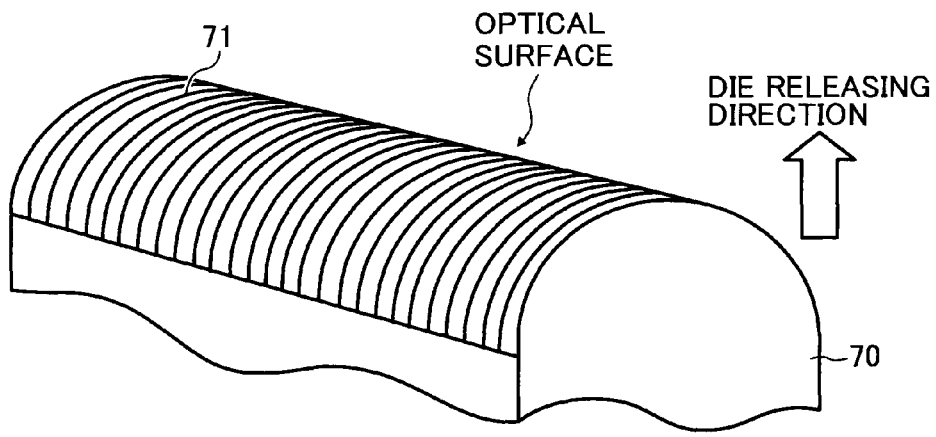
FIGS. 20A-20C include a schematic view illustrating another example of the optical element of the present invention, and cross sectional views illustrating grooves formed on the cylindrical optical element.
Figure 20B:
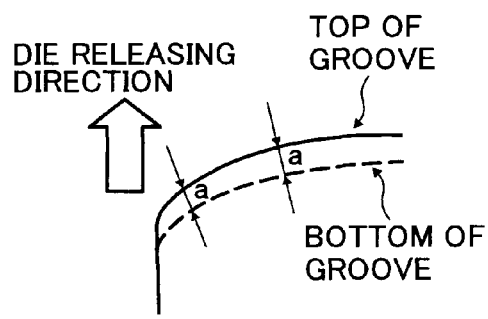
Figure 20C:
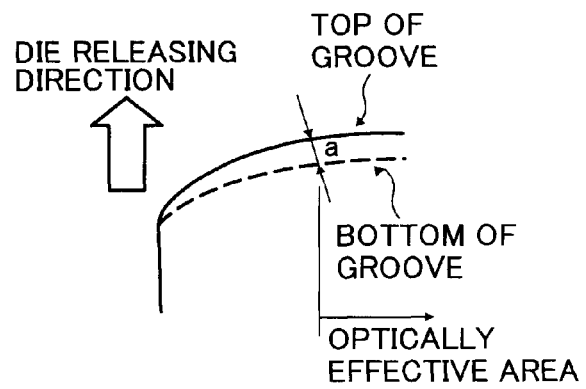

FIGS. 20A-20C are schematic views illustrating another example of the optical element of the present invention, which has an optical surface having a curvature in only one direction.

Referring to FIG. 20A, an optical element 70 has a surface having a curvature in only one direction, and grooves 71 which are formed on the surface so as to have a curvature in the same direction. In this regard, the die releasing direction is indicated by an arrow. The interval between two adjacent grooves is 300 nm. Thus, the fine grooves 71 are formed on at least the optically effective region of the surface of the optical element 70.

The width and depth of the grooves 71 are 300 nm and 400 nm, respectively. Similarly to the optical element 20 in Example 1, it is preferable that each of the grooves has a depth of 400 nm in the light beam moving direction.

The die (not shown) used for molding the resinous optical element 70 having such fine groove patterns as illustrated in FIG. 20A has inverted groove patterns on the surface thereof. Such inverted groove patterns are previously formed on the surface of the die. The optical element 70 was prepared using the die and a resin molding method. This optical element has good releasability and desired grooves can be formed thereon.

It was confirmed that the surface of the thus prepared optical element 70 has a reflectance of not greater than 0.4% against a laser beam with a wavelength of 600 nm. This optical element 70 can be used as, for example, a cylindrical lens for collimating a laser beam, which can be used for optical scanning devices.

In optical elements having a surface having a curvature in only one direction or a surface slanting in only one direction, the grooves formed on the surface are not radically-extending grooves, and are grooves which extend along the slope and which are arranged at regular intervals. In the optical device illustrated in FIG. 20B, the entire portions of the grooves have a predetermined depth (a). In addition, the direction of the outer surface is identical to the die releasing direction, and therefore the die releasing problem does not occur.

Grooves illustrated in FIG. 20C can also be used. The grooves have a predetermined depth (a) in at least the optically effective area of the surface of the optical element. The depth of the grooves is decreased in a direction of from the end of the optically effective area to the end of the grooves. In this case, the optical element has better die releasability because the end portions of the grooves can be easily released from the die.

Similarly to the optical elements illustrated in FIGS. 12 and 15, the central potion (i.e., the ridge portion in this case) of the surface of the optical element illustrated in FIG. 20A can have patters (such as projections and circular grooves) other than the above-mentioned grooves. In this case, grooves similar to the grooves 71 illustrated in FIG. 20A are formed from the edge of the central portion.

Example 8

Figure 21A:
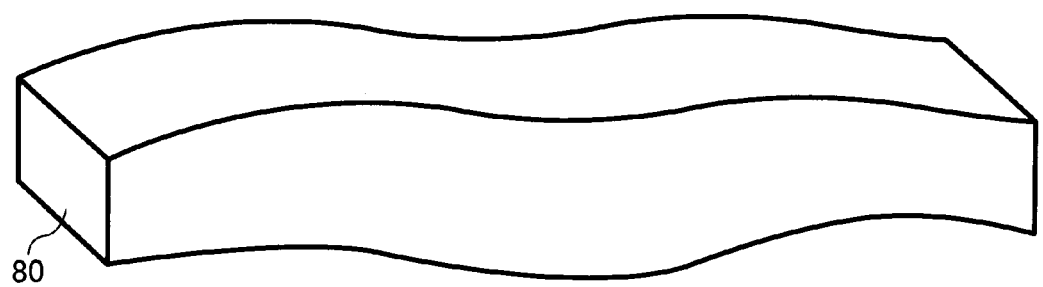
FIGS. 21A and 21B include a schematic perspective view illustrating another example of the optical element of the present invention, and a plan view illustrating the surface of the optical element.
Figure 21B:
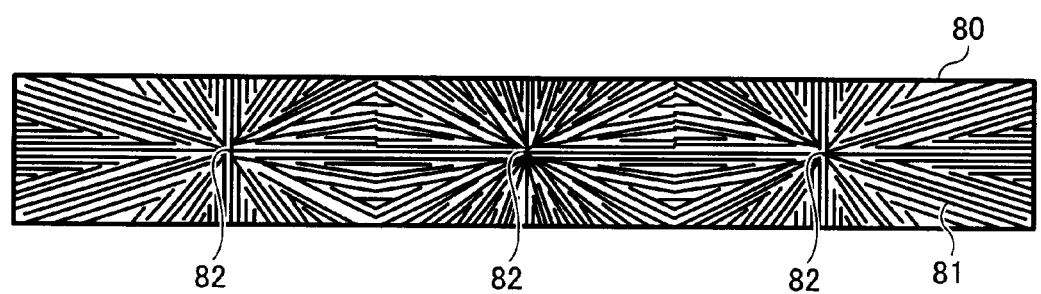

FIGS. 21A and 21B are schematic views illustrating another example of the optical element of the present invention, which is an f-θ lens for use in an optical device of laser beam printers and which has a complex curved surface.

Referring to FIGS. 21A and 21B, an optical surface 80 has three reference points 82 on the optical surface thereof at which the die releasing direction is identical to the direction of the normal line of the surface. As illustrated in FIG. 21B, radially extending grooves 81 similar to the grooves 21 formed on the surface of the optical element 20 illustrated in FIG. 10 are formed on the surface of the optical element 80. The grooves 81 can be formed in such a manner as described in Example 1.

The optical elements of Examples 1-8 can be preferably used for lenses, etc., for use in optical devices such as still cameras, video cameras, optical microscopes and telescopes. In addition, the optical elements can also be used for optical systems for optical scanning devices, image displaying devices, optical pickup devices, etc.

Example 9

Figure 22:
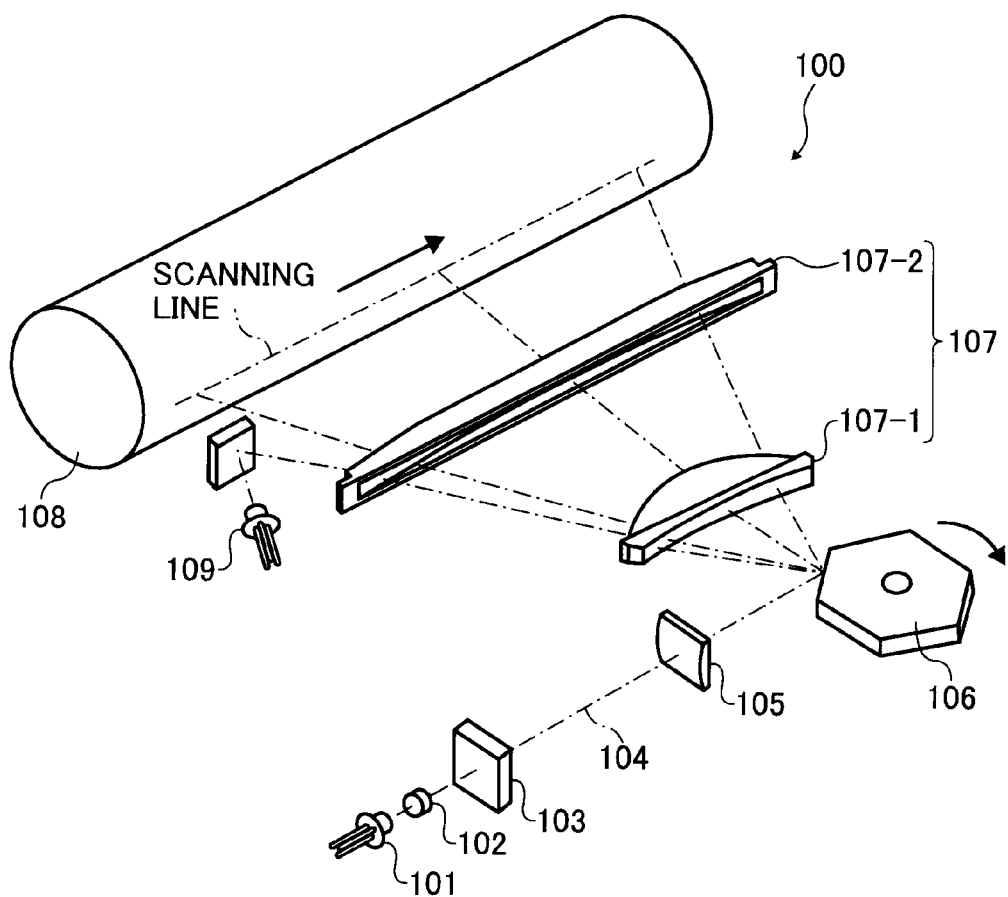
FIG. 22 is a schematic view illustrating an example of the optical scanning device of the present invention.

FIG. 22 is a schematic view illustrating an example of the optical scanning device of the present invention, which uses the optical element of the present invention.

In an optical scanning device 100 illustrated in FIG. 22, a light beam 104 emitted from a laser diode 101 passes through a collimator lens 102 and aperture 103 to be faired. When passing a cylindrical lens 105, the light beam 104 is focused by the lens 105 on the surface of a polygon mirror 106 serving as a deflecting device. In this regard, the light beam 104 is focused in the sub-scanning direction (i.e., the vertical direction of the polygon mirror) and has a form of a line extending in the main scanning direction (i.e., the horizontal direction of the polygon mirror). The light beam 104 deflected by the surface of the polygon mirror 106 is allowed to scan, as a beam spot, the surface of a photoreceptor drum 108 serving as an image bearing member by a scanning and focusing optical system 107 including a first scanning lens 107-1 and a second scanning lens 107-2. A beam detecting sensor 109 is provided at a position, which is optically equivalent to the surface of the photoreceptor drum 108, to determine the start position of the light beam in the main scanning direction.

The above-mentioned optical elements can be preferably used for the collimator lens 102, the first scanning lens 107-1, and the second scanning lens 107-2. In this case, generation of flare light can be prevented because the lenses have good reflection preventing property. Therefore, clear light images can be formed on the surface of the photoreceptor drum 108.

Example 10

Figure 23:
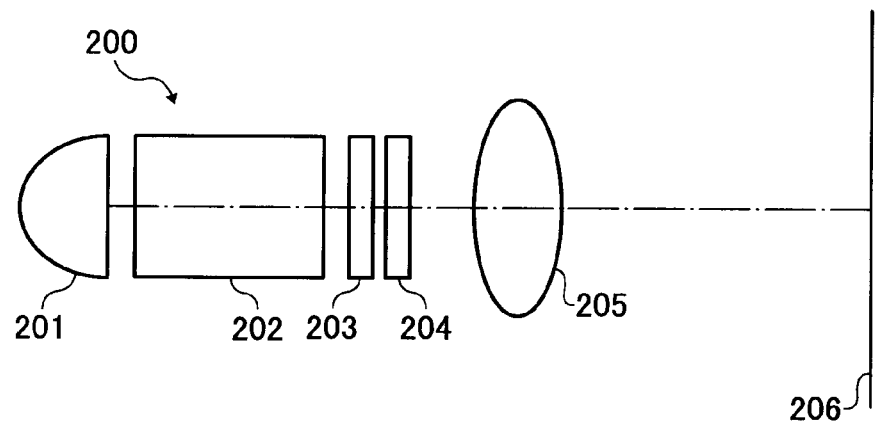
FIG. 23 is a schematic view illustrating an example (projector) of the image displaying device of the present invention.

FIG. 23 is a schematic view illustrating an example (projector) of the image displaying device of the present invention, which uses the optical element of the present invention.

Referring to FIG. 23, an image displaying device 200 includes a light source (a lamp) 201, a spatial light modulator (e.g., a liquid crystal light valve) 203 configured to form pixels, an illuminating system 202 configured to uniformly guide the light emitted by the light source 201 to the spatial light modulator 203, a projection lens 205 configured to project the imagewise light, which is out put from the spatial light modulator 203, to a screen 206, and a light path deflecting element 204, which is arranged between the spatial light modulator 203 and the projection lens 205 to deflect the path of the imagewise light.

The image displaying device 200 includes a combination of the spatial light modulator 203 and the light path deflecting element 204 (which is also called a pixel shifting element, a wobbling element, or a light path shifting element). By using the light path deflecting element capable of deflecting the path of the imagewise light from the spatial light modulator, an image having a resolution plural times the resolution of the spatial light modulator 203 can be displayed on the screen 206.

Specific examples of the spatial light modulator 203 include single plate type spatial light modulators in which three color pixels of red (R), green (G) and blue (B) are arranged on a single liquid crystal light valve, and three-plate type spatial light modulators in which three liquid crystal light valves for R, G and B pixels are overlaid. Thus, the spatial light modulator 203 can display color images.

The above-mentioned optical elements can be preferably used for the projection lens 205, and the lens and the diffraction optical element of the illuminating system 202. In this case, generation of flare light can be prevented because the lenses have good reflection preventing property. Therefore, clear light images can be formed on the screen 206.

Example 11

Figure 24:
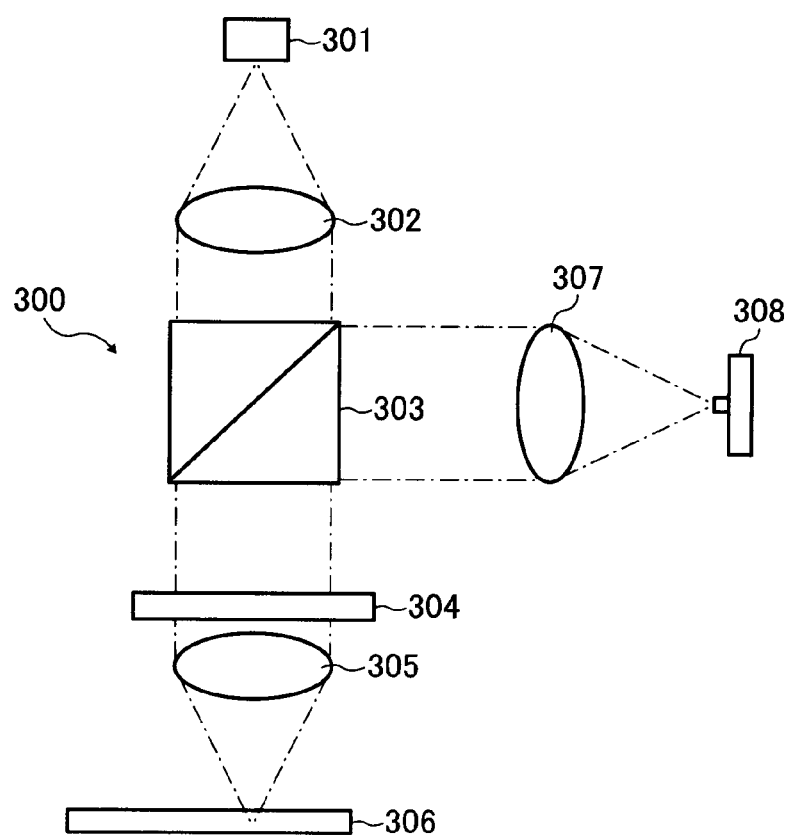
FIG. 24 is a schematic view illustrating an example of the optical pickup device of the present invention.

FIG. 24 is a schematic view illustrating an example of the optical pickup device of the present invention, which uses the optical element of the present invention.

In an optical pickup device 300 illustrated in FIG. 24, light emitted by a light source (e.g., a laser diode) 301 is collimated by a collimator lens 302. After passing a polarizing beam splitter 303 and a quarter wave plate 304, the collimated light is focused on a recording medium (e.g., an optical recording medium) 306 by an objective lens 305. The light reflected from the recording medium 306 passes through the objective lens 305 and the quarter wave plate 304. The light is then reflected by the polarizing beam splitter 303, and the reflected light is focused on a photo detector (a photo acceptor) 308 by a condenser 307.

In the optical pickup device 307 illustrated in FIG. 24, the objective lens 305 includes a light spot controlling mechanism configured to move the objective lens 305 in both the direction of the optical axis thereof and the direction perpendicular to the optical axis direction. Thereby, the position of the light spot relative to the optical recording medium 306 can be adjusted. Thus, the light emitted by the light source 301 irradiates the recording layer of the optical recording medium 306 after being modulated to record information in the recording layer. In addition, by irradiating the recording layer with the light emitted by the light source 301 and detecting the light reflected from the recording layer by the photo detector 308, information stored in the recording layer can be read.

The above-mentioned optical elements can be preferably used for the collimator lens 302, the objective lens 305, and the condenser 307. In this case, generation of flare light can be prevented because the lenses have good reflection preventing property. Therefore, recording and reproduction of in formation can be performed with high precision.

Hereinbefore, examples in which the molded part of the present invention is applied to optical elements have been explained. However, the molded part of the present invention has other applications (such as improvement in wettability and friction coefficient) as well as application for optical elements. Specific examples of the applications are as follows.

Example 12

Controlling of Wettability

By using a die, on the surface of which a pattern (an inverted pattern) for forming grooves similar to the grooves in the above-mentioned examples is formed, a molded part having thereon rectangular grooves having a pitch of 4 μm, a width of 2 μm, and a depth of 3 μm was formed. In view of die releasability, the grooves are formed at a releasing angle of 2 degree. Thus, the surface of the molded part has good water repellent property, and therefore the wet ability of the surface against liquids can be controlled. It was confirmed that the surface of the molded part has a contact angle of 170 degree against liquids. This molded part can be used for the covers of headlights, taillights, and side markers of automobiles.

Controlling of Friction Coefficient

By using a die on the surface of which a pattern (an inverted pattern) for forming grooves similar to the grooves in the above-mentioned examples is formed, a molded part having thereon V-form grooves having a pitch of 5 µm, a width of 3 µm, and a depth of 2 µm was formed. It was confirmed that the surface of the molded part has a friction coefficient which changes depending on the friction direction (hereinafter referred to as a direction-dependent friction coefficient). Specifically, the friction coefficient of the surface in the direction parallel to the V-form grooves is lower than that in the direction perpendicular to the V-form grooves. Such a molded part can be preferably used for parts which are oscillated in a particular direction.

This document claims priority and contains subject matter related to Japanese Patent Application No. 2006-183320, filed on Jul. 3, 2006, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A molded part prepared by a mold transfer method using a die, comprising:
    a surface which includes a slope, a direction of a normal line of the slope being different from a die releasing direction, and the surface including a reference point at which the normal line direction is substantially identical to the die releasing direction; and
    a pattern which is formed on the surface and which includes grooves located on at least a portion of the slope so as to extend along the slope in a slanting direction of the slope, the grooves including grooves linearly-extending in a radial direction from the reference point or a vicinity of the reference point toward the slanting direction of the slope, and the grooves including intervening grooves between the linearly-extending grooves spaced apart from the reference point or the vicinity of the reference point, at least one of the intervening grooves including an intersection such that no groove extends from the intersection toward the reference point or the vicinity of the reference point, each of the grooves having a width not greater than an interval between two adjacent grooves, and the width being substantially equal to the interval between the two adjacent grooves.

2. The molded part according to claim 1, wherein the pattern further includes a second pattern other than the linearly-extending and the intervening grooves, and wherein the second pattern is present in the vicinity of the reference point.

3. The molded part according to claim 1, wherein the molded part is an optical element having an antireflection function, and wherein an interval between two adjacent grooves is not greater than a wavelength of light irradiating the optical element.

4. The molded part according to claim 1, wherein the portion of the slope on which the grooves are formed is different from other portions of the surface on which the grooves are not formed in at least one of releasability, wettability and friction coefficient.

5. The molded part according to claim 4, wherein the portion of the slope is different from the other portions in friction coefficient, and wherein the portion of the slope has a direction-dependent friction coefficient.

6. An optical element, which is substantially transparent and which has an antireflection function, comprising:
    the molded part according to claim 1,
    wherein an interval between two adjacent grooves formed on the portion of the slope is not greater than a wavelength of light irradiating the optical element.

7. An optical device comprising:
    a light source configured to emit light; and
    the optical element according to claim 6 configured to process the light, wherein the light enters the optical element from the surface on which the grooves are formed, and
    wherein the interval between two adjacent grooves is not greater than the wavelength of the light emitted by the light source.

8. The optical device according to claim 7, wherein the optical device is an optical scanning device comprising:
    the light source;
    a collimating device configured to collimate the light emitted by the light source;
    a deflecting device configured to deflect the collimated light; and
    a scanning and focusing device configured to scan a surface with the collimated light while focusing the light on the surface to be scanned, and
    wherein at least one of the collimating device and the scanning and focusing device includes the optical element.

9. The optical device according to claim 8, wherein the collimating device includes a collimator lens, and wherein the collimator lens includes the optical element.

10. The optical device according to claim 8, wherein the collimating device includes a cylindrical lens, and wherein the cylindrical lens includes the optical element.

11. The optical device according to claim 8, wherein the scanning and focusing device includes a scanning lens, and wherein the scanning lens includes the optical element.

12. The optical device according to claim 7, wherein the optical device is an image displaying device comprising:
    the light source;
    an illuminating device configured to guide the light emitted by the light source;
    an image displaying element configured to convert the light from the illuminating device to imagewise light; and
    a projection lens configured to project the imagewise light to a screen,
    wherein at least one of the illuminating device and the projection lens includes the optical element.

13. The optical device according to claim 7, wherein the optical device is an optical pickup device comprising:
    the light source;
    a collimating device configured to collimate the light emitted by the light source;
    an objective lens configured to focus the collimated light on an optical recording medium;
    a condenser configured to condense the light reflected from the optical recording medium; and
    a photodetector configured to receive the condensed light,
    wherein at least one of the collimating device, the objective lens and the condenser includes the optical element.

14. The molded part according to claim 1, wherein the linearly-extending and the intervening grooves include a releasing angle of less than or equal to 2° from the die releasing direction.

15. The molded part according to claim 1, wherein the linearly-extending and the intervening grooves include a V-form, the interval between the two adjacent grooves is 5 µm, the width of the grooves is 3 µm, and a depth of the grooves is 2 µm.

16. The molded part according to claim 1, wherein a depth of the linearly-extending and the intervening grooves is greater than the interval between the two adjacent grooves.

17. The molded part according to claim 1, wherein at least two of the pattern are formed adjacent to one another on the surface.

* * * * *